Oct. 20, 1970  KENICHI YAMAMOTO  3,535,061
ROTOR OF ROTARY PISTON ENGINE
Filed Sept. 3, 1969

Oct. 20, 1970   KENICHI YAMAMOTO   3,535,061
ROTOR OF ROTARY PISTON ENGINE
Filed Sept. 3, 1969   2 Sheets-Sheet 2

United States Patent Office 3,535,061
Patented Oct. 20, 1970

3,535,061
ROTOR OF ROTARY PISTON ENGINE
Kenichi Yamamoto, Hiroshima-shi, Japan, assignor to Toyo Kogyo Kabushiki Kaisha, Hiroshima-ken, Japan, a corporation of Japan
Continuation-in-part of application Ser. No. 719,981, Apr. 9, 1968. This application Sept. 3, 1969, Ser. No. 857,292
Int. Cl. F04c *17/02, 27/00*
U.S. Cl. 418—142      8 Claims

ABSTRACT OF THE DISCLOSURE

This invention relates to an improved rotor for a rotary piston engine in which an oil seal ring can be easily removed for disassembling and repairing of the rotary piston engine, and for achieving this at least one cut is provided on the side wall of the circular groove cut out on the rotating thrust face for fitting the oil seal ring.

---

This application is a continuation-in-part application of my copending Ser. No. 719,981 filed Apr. 9, 1968, now abandoned.

The present invention relates to a rotor for a rotary piston engine whose oil seal ring is made readily removable for repairing or disassembling or overhauling of the engine.

In a rotary piston engine, oil is supplied for cooling the rotor and lubricating the bearings and for preventing the oil, as the rotor rotates, from entering into the working chamber by passing between the rotating thrust face of the rotor and the inner face of the side housing. It has been proposed to apply an oil seal device on the rotating thrust face of the rotor and many such devices have been suggested.

Generally in a rotary piston engine whose polygonal rotor is set to planetarily rotate in the casing having a polyarci-formed inner face, oil-tightness between the casing and the rotor is maintained by fitting the oil seal ring with the spring disposed in the circular seal groove provided on the rotating thrust face of the rotor. Heretofore, the radial clearance between the oil seal ring and the circular groove being relatively small, removal of the oil seal ring was difficult, and the oil seal ring was removed by means of pinching its portion projecting out of the rotating thrust face of the rotor with pliers or the like. Accordingly, the side face of the oil seal is liable to be damaged, and there is a danger of rendering reuse of the oil seal ring impossible.

An object of the present invention is to provide a rotor for a rotary piston engine in which the oil seal ring is readily removable.

Another object of the present invention is to provide a rotor for a rotary piston engine in which the rotor is preliminarily worked for providing the jig by which the oil seal ring is removable.

Another object of the present invention is to provide a rotor for a rotary piston engine by which the oil seal ring can be used repeatedly without damaging the same when disassembling.

A further object of the invention is to provide a rotor for a rotary piston engine in which a notch is provided for mounting the jig, the notch having a size not detrimental to the oil seal effect.

According to the present invention, I provide a rotor for a rotary piston engine having an oil seal ring on the rotor thrust face characterized by at least one annular oil seal ring, a corresponding number of annular grooves forming in the thrust face for receiving the annular oil seal rings, and at least one cut on the side wall of the annular groove. The depth of the cut is selected so that when the rotor is in operative position, the bottom surface of the cut is positioned axially outwardly with respect to the bottom surface of the oil seal ring, and when the rotor is being disassembled, at least one surface of the surfaces directed axially inwardly of the oil seal ring, is positioned axially outwardly with respect to the bottom surface of the cut due to the force of a spring.

The present invention will be described more in detail referring to an illustrative embodiment shown in the drawing, in which.

Figure 2:
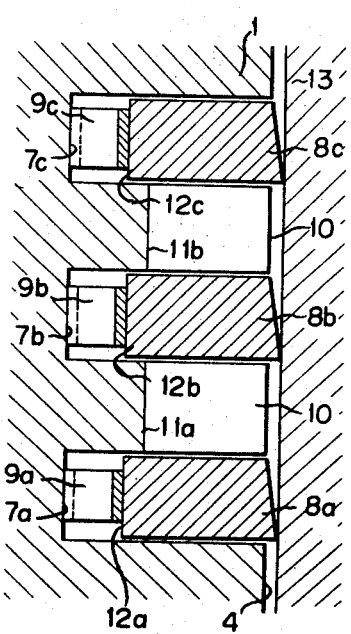
FIG. 2 is a vertical sectional view illustrating details of the structure shown in FIG. 1 fitted within the casing.
Figure 3:
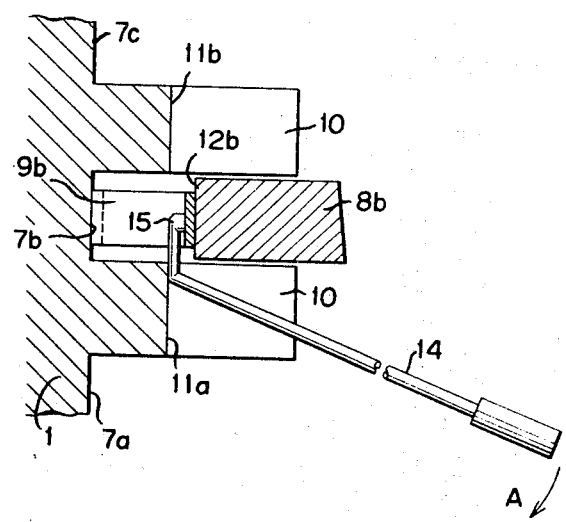
FIG. 3 is a vertical sectional side view of the structure illustrating removal of an oil seal ring with a jig.

In the drawing, 1 is a polygonal rotor, 2 an apex seal fitted on the apex of the rotor 1, 3 a corner seal fitted on the rotating thrust face 4 of the rotor 1 positioned at the end of the apex seal 2; 5 is a side seal fitted on the rotating thrust face 4 of the rotor 1, connecting the adjacent corner seals 3, 6 a center bearing bore of the rotor 1; 7a, 7b and 7c are the circular grooves cut out on the rotating thrust face 4 of the rotor 1 concentrically on the center bearing bore 6; 8a, 8b and 8c are circular oil seal rings, with springs 9a, 9b and 9c fitted in the circular grooves 7a, 7b and 7c; 10 are the cuts in appropriate numbers provided on the side walls of circular grooves 7a, 7b and 7c, and are provided respectively by at least one to the side walls of all the circular grooves 7a, 7b, 7c, and in disassembling their bottom walls 11a, 11b must be positioned inwards to the rear faces 12a, 12b, 12c of the oil seal rings 8a, 8b, 8c as shown in FIG. 3 under the resilience of the springs 9a, 9b, 9c. Further, it is preferable, for avoiding oil leakage, to make the bottom walls 11a, 11b of these cuts 10, as shown in FIG. 2, positioned outward from the rear faces 12a, 12b, 12c of the oil seal rings 8a, 8b, 8c, when the oil seal rings 8a, 8b, 8c are assembled within the casing 13 compressing respective springs 9a, 9b, 9c.

FIG. 3 shows the state of disassembling the engine, in which the rotor 1, provided with the oil seal rings 8a, 8b, 8c, is removed from the casing 13, and the oil seal rings 8a and 8c have already been removed. The oil seal ring 8b projects out of the circular groove 7b under the resilience of the spring 9b, and the rear face 12b of the oil seal ring 8b is positioned outward from the bottom wall 11a of the cut 10. In such a state, by means of inserting the top end 15 of the jig 14 to the rear face 12b of the oil seal ring 8b, and turning the jig 14 in the direction of arrow A, the oil seal ring 8b can be simply and readily removed.

This device being structured as described, it will be appreciated that the oil seal ring can be removed simply and readily from the circular groove provided on the rotor with no damage on the side face of the oil seal ring.

Further, in this device a triplex and a duplex oil seal ring are described, but the concept of this invention can be similarly practiced regardless of the number of the oil seal rings, and the cut may be provided on either the inner or outer side wall of the circular groove.

Figure 1:
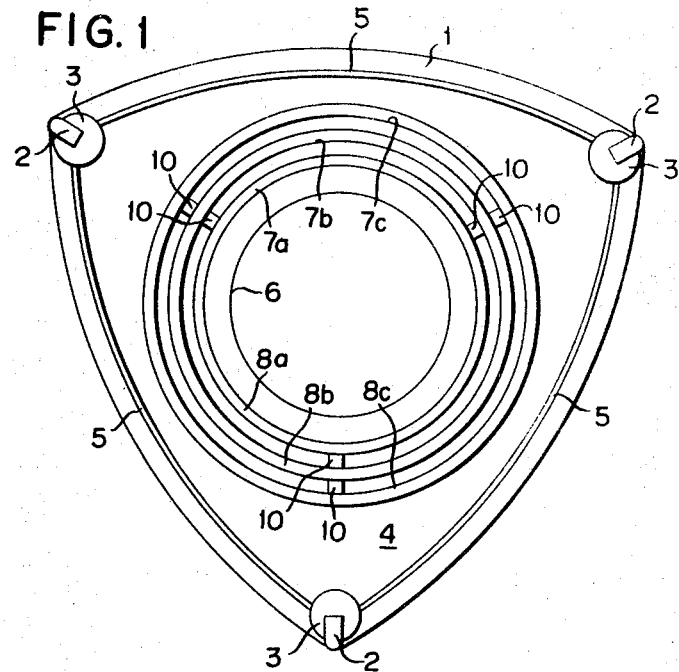
FIG. 1 is a front view illustrating various kinds of seals fitted on a rotor according to the present invention.

It will be appreciated that when the rotor 1 is removed from the casing 13, the rings 8a, 8b and 8c cannot be removed by merely turning the rotor with its side face, as shown in FIG. 1, facing downwardly. The rings drop out of their own accord with the assistance of the spring elements 9a, 9b and 9c, because of several factors. The clearance between the circular grooves 7a, 7b and 7c and the oil seal rings 8a, 8b and 8c respectively, is very small and the seal grooves and seal rings are annular so that when the rotor is turned with its side face facing downwardly, the seal ring inclines against the seal groove and is caught by the surfaces of the seal groove. In addition, because the clearance between the seal groove and the seal ring is very small, the seal ring is prevented from dropping out by the surface tension of the oil, if oil is retained. Moreover, when carbon sludge has accumulated in the clearance after a period of time in operation, it prevents the seal ring from dropping out. In the embodiment of the invention illustrated in FIGS. 4 and 5, an O-ring is used between the seal groove and the seal ring which prevents the ring from dropping out due to the frictional force. It is impossible to remove the ring from the groove by the use of pliers without injuring the sliding surfaces of the seal ring because the amount of projection of the seal ring from the rotor due to spring action is not large and because the surface of the seal ring which engages the side housing is inclined. Accordingly, it is necessary to provide means for removing the seal ring.

Figure 4:
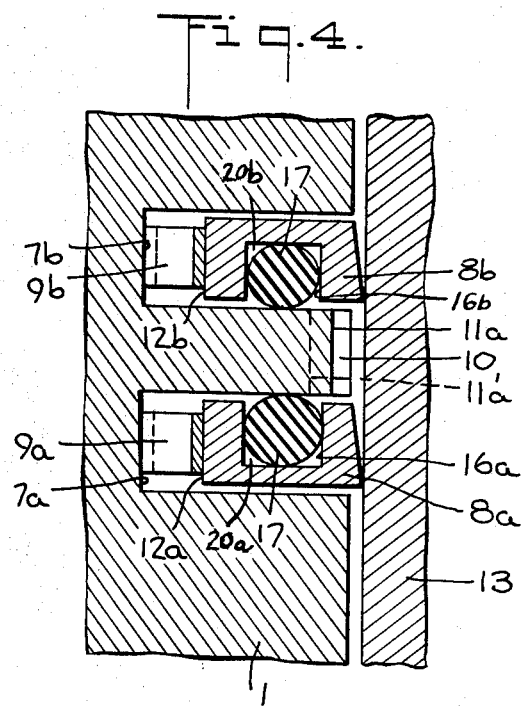
FIG. 4 is a vertical sectional view similar to FIG. 2, but illustrating another embodiment of the invention.
Figure 5:
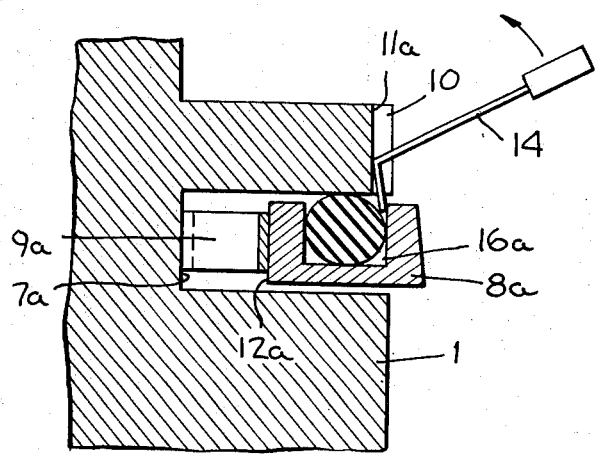
FIG. 5 is a vertical sectional side view of the structure of FIG. 4, illustrating removal of the oil seal ring with a jig.

In the embodiment of the invention illustrated in FIGS. 4 and 5, oil seal rings 8a and 8b are provided with annular grooves 20a and 20b, respectively, to receive therein O-rings 17. FIG. 4 shows the structure in operative position, whereas FIG. 5 shows the structure during disassembly. As shown in FIG. 5, during disassembly the bottom surface 11a of the cut 10 must be located inside of the top surface 16a and 16b of the ring 8a and 8b, respectively, due to the force exerted by the spring 9a and 9b, respectively, thereby determining the depth of the cut 10. The leading edge of the jig 14 can be inserted against the surface 16a of the ring 8a to remove the ring. With this embodiment, the depth of the cut can be made very small, thereby preventing oil or gases from leaking past the back surface of the oil seal ring. Moreover, due to the shallow cut, the strength of the wall of the seal groove of the rotor is significantly increased and the workability of the cut is improved. In fact, it has been found that a depth of cut of about 2 millimeters is sufficient in some installations. This can be fabricated as a cone-shaped cut by a drill.

The bottom surface 11a of the cut 10 is preferably placed, as shown in FIG. 4, outside of the top surface 16a for improving the function of the O-ring. However, this is not always necessary, and it may be positioned inside the bottom surface 16a, as shown by the broken line 11a' in FIG. 4.

The position of the cut should be on the side wall of the seal groove at the side of the O-ring, and if the O-rings are provided facing each other, as shown in FIG. 4, one cut can serve both seal rings.

It will be appreciated that for certain installations the O-ring 17, as shown in FIGS. 4 and 5, may be omitted and in such an installation the annular groove serves to impart elasticity to the oil seal ring itself in the axial direction. However, the top surfaces 16a and 16b are utilized for removing the oil seal ring in the same manner, as shown in FIG. 5.

What is claimed is:
1. In a rotor for a rotary piston engine having an oil seal ring on the rotor thrust face, the improvement which comprises, at least one annular oil seal ring, at least one annular groove formed in the thrust face for receiving said annular oil seal ring and at least one cut on the side wall of the annular groove, the depth of the cut being so determined that when working the bottom surface of the cut is positioned axially outward from the bottom surface of the oil seal ring and when disassembling a least one surface of the surfaces directed axially inwardly of the oil seal ring is positioned axially outward from the bottom surface of the cut by the force of a spring.

2. In a rotary piston engine having a casing, a rotor and an oil seal ring on the rotor thrust face, the improvement which comprises, means forming at least one groove formed in the thrust face for receiving an oil ring seal, and means forming at least one cut on the side wall of the groove, the bottom surface of the cut being positioned axially outwardly with respect to the bottom surface of the oil seal ring when the rotor is in its operative position, a spring for urging said bottom surface of the oil seal ring to a position axially outwardly with respect to the bottom surface of the cut during disassembly when said rotor has been removed from said casing.

3. A rotary piston engine according to claim 2 wherein there are a plurality of seal grooves provided on the rotor thrust face and a common cut simultaneously associated with adjacent seal grooves at a portion sandwiched between the adjacent grooves.

4. In a rotary piston engine having a casing rotor means, and oil seal ring means on the rotor thrust face, the improvement which comprises at least one annular oil seal ring having at least one annular groove in the side wall thereof, at least one annular groove formed in the thrust face for receiving said annular oil seal ring and at least one cut on the side wall of the annular groove, the bottom surface of the cut being positioned axially outwardly with respect to the bottom surface of the oil seal ring when the rotor is in its operative position, spring means for urging said oil seal ring axially outwardly until the top surface of the annular groove in the oil seal ring is positioned axially outwardly with respect to the bottom surface of the cut during disassembly when the rotor has been removed from said casing.

5. A rotary piston engine according to claim 4 further comprising an O-ring mounted in said annular groove in the side wall of the oil seal ring.

6. A rotary piston engine according to claim 4 further comprising a plurality of seal grooves provided on the rotating thrust face, and wherein said annular grooves in the side faces of adjacent oil seal rings are disposed facing each other, and wherein a common cut is simultaneously associated with adjacent seal grooves at a portion sandwiched between the adjacent grooves.

7. A rotary piston engine according to claim 4 wherein the bottom surface of the cut is positioned axially outwardly with respect to said annular groove in the side wall of said oil seal ring when the rotor is in its operative position.

8. In a rotary piston engine having a casing, rotor means, and oil seal ring means on the rotor thrust face, the improvement which comprises at least one annular oil seal ring having at least one annular groove in the side wall thereof, at least one annular groove formed in the thrust face for receiving said annular oil seal ring and at least one cut on the side wall of the annular groove, the top surface of the annular groove in the oil seal ring being positioned axially outwardly with respect to the bottom surface of the cut whereby a jig can be inserted through the cut to engage the top surface of the annular groove in the oil seal ring to remove said ring from the rotor.

References Cited
UNITED STATES PATENTS

| | | | |
|---|---|---|---|
| 3,033,180 | 5/1962 | Bentele | 123—8 |
| 3,102,518 | 9/1963 | Anderson | 123—8 |
| 3,176,910 | 4/1965 | Bentele | 230—145 |
| 3,251,541 | 5/1966 | Paschke | 230—145 |
| 3,300,127 | 1/1967 | Yamamoto et al. | 123—8 |
| 3,323,712 | 6/1967 | Froede et al. | 123—8 |

FOREIGN PATENTS 967,040  8/1964  Great Britain.

DONLEY J. STOCKING, Primary Examiner

W. J. GOODLIN, Assistant Examiner

U.S. Cl. X.R.

123—8